United States Patent
Jung et al.

(10) Patent No.: US 10,208,166 B2
(45) Date of Patent: Feb. 19, 2019

(54) POLYPHOSPHONATE, AND LENS AND CAMERA MODULE INCLUDING THE SAME

(71) Applicants: Samsung Electro-Mechanics Co., Ltd., Suwon-si (KR); The University Court of The University of Edinburgh, Edinburgh (GB)

(72) Inventors: Hoe-Chul Jung, Seoul (KR); Michael Patrick Shaver, Limekilns (GB); Emily Kate Macdonald, Castle Douglas (GB)

(73) Assignees: Samsung Electro-Mechanics Co., Ltd., Suwon-si (KR); The University Court of The University of Edinburgh, Edinburgh (GB)

( * ) Notice: Subject to any disclaimer, the term of this patent is extended or adjusted under 35 U.S.C. 154(b) by 367 days.

(21) Appl. No.: 15/074,295

(22) Filed: Mar. 18, 2016

(65) Prior Publication Data
US 2016/0289391 A1 Oct. 6, 2016

(30) Foreign Application Priority Data
Mar. 31, 2015 (KR) ........................ 10-2015-0045097

(51) Int. Cl.
*C08G 79/04* (2006.01)
*B29D 11/00* (2006.01)
*B29C 45/00* (2006.01)
*G02B 1/04* (2006.01)

(52) U.S. Cl.
CPC .......... *C08G 79/04* (2013.01); *B29C 45/0001* (2013.01); *B29D 11/00009* (2013.01); *B29D 11/00413* (2013.01); *G02B 1/041* (2013.01)

(58) Field of Classification Search
CPC .. C08G 79/04; G02B 1/041; B29D 11/00009; B29D 11/00413; B29C 45/0001
See application file for complete search history.

(56) References Cited

U.S. PATENT DOCUMENTS

| 5,216,113 | A | * | 6/1993 | Schulz-Schlitte | C08G 79/02 528/125 |
| 6,288,210 | B1 | * | 9/2001 | Shobha | C08G 79/04 264/1.32 |

FOREIGN PATENT DOCUMENTS

KR 2003-0085020 A 11/2003

* cited by examiner

*Primary Examiner* — Mathieu D Vargot
(74) *Attorney, Agent, or Firm* — NSIP Law

(57) ABSTRACT

A polyphosphonate, a lens including the polyphosphonate, a camera module including the polyphosphonate lens, and a method of producing the lens are provided. The polyphosphonate includes a constitutional repeating unit comprising a phosphate ester group and an aromatic ring, and the phosphate ester group is directly bonded to the aromatic ring in the constitutional repeating unit.

15 Claims, 2 Drawing Sheets

POLYPHOSPHONATE, AND LENS AND CAMERA MODULE INCLUDING THE SAME

CROSS-REFERENCE TO RELATED APPLICATIONS

This application claims the benefit under 35 USC 119(a) of Korean Patent Application No. 10-2015-0045097 filed on Mar. 31, 2015, in the Korean Intellectual Property Office, the entire disclosure of which is incorporated herein by reference for all purposes.

BACKGROUND

1. Field

The following description relates to a polyphosphonate, a lens including polyphosphonate, a camera module using the polyphosphonate lens, and the method of preparing the polyphosphonate and the lens.

2. Description of Related Art

In various optical systems of cameras, optical glasses or transparent resins for optical applications are used as materials to produce optical elements.

An optical glass exhibits good heat resistance, transparency, dimensional stability, chemical resistance and the like, producing a lens that is stable in dimension. Various other materials with different refractive indexes (nD) or Abbe's numbers (υD) are commercially available and have been considered as a possible material for producing optical elements. However, many of these materials tend to be expensive and have poor moldability and low productivity. With some materials, high-tech processes are necessary to shape the materials into aspherical lenses that may be used for aberration correction in cameras, thus, increasing the manufacturing cost.

The use of a transparent resin for optical applications for camera lenses and the like is described in KR Patent Publication No 2003-0085020, which discloses transparent molded objects, optical member, and plastic lens, as well as process for producing these objects.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a polyphosphonate includes a constitutional repeating unit including a phosphate ester group and an aromatic ring, and the phosphate ester group is directly bonded to the aromatic ring in the constitutional repeating unit.

The constitutional repeating unit may be represented by Formula 1:

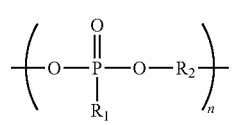

[Formula 1]

wherein $R_1$ is a heavy hydrogen, a substituted or unsubstituted $C_1$-$C_{10}$ aliphatic chain, a substituted or unsubstituted $C_3$-$C_{10}$ aliphatic ring, a substituted or unsubstituted $C_6$-$C_{20}$ aromatic ring, or a combination thereof;

n is an integer of 5 to 500; and $R_2$ is one selected from the group consisting of Formula 2 to Formula 5:

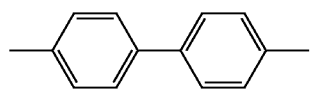

[Formula 2]

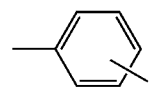

[Formula 3]

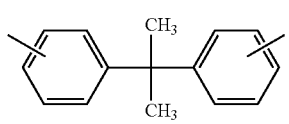

[Formula 4]

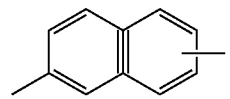

[Formula 5]

The constitutional repeating unit may be represented by Formula 6:

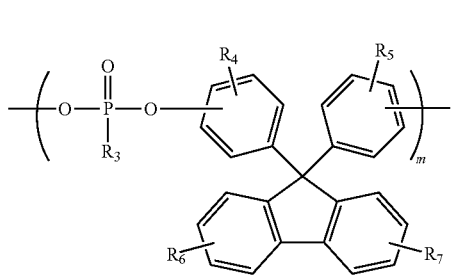

[Formula 6]

wherein $R_3$ is a heavy hydrogen, a substituted or unsubstituted $C_1$-$C_{10}$ aliphatic chain, a substituted or unsubstituted $C_3$-$C_{10}$ aliphatic ring, a substituted or unsubstituted $C_6$-$C_{20}$ aromatic ring, or a combination thereof;

$R_4$ to $R_7$ is the same or different, independently, a hydrogen atom, a substituted or unsubstituted $C_1$ to $C_{20}$ aliphatic chain, a substituted or unsubstituted $C_3$-$C_{10}$ aliphatic ring, a substituted or unsubstituted $C_6$-$C_{20}$ aromatic ring, or a combination thereof; and m is an integer of 5 to 500.

The polyphosphonate does not include a sulfur atom.

The polyphosphonate does not include a halogen substituent.

The polyphosphonate does not include a nitrogen atom that is directly bonded with at least one hydrogen atom.

The polyphosphonate is formed by a condensation polymerization between an aromatic dihydroxy compound and a diphosphonic acid or its ester forming derivative.

In another general aspect, a lens includes the general aspect of the polyphosphonate described above.

The lens may be formed by injection molding a polymer composition including the polyphosphonate.

The lens may have a refractive index of 1.57 or higher at a wavelength of 587 nm.

The lens may have a transmissibility of 86% or higher.

The lens may have an APHA value of 50 or less.

In another general aspect, a camera module includes a lens including the general aspect of the polyphosphonate described above.

In yet another general aspect, a method of producing a lens involves injection molding a lens using a polyphosphate composition including a polyphosphate including a constitutional repeating unit including a phosphate ester group and an aromatic ring, and the phosphate ester group is directly bonded to the aromatic ring in the constitutional repeating unit.

The injection molding may be performed at a temperature between approximately 240° C. and 280° C.

The injection molding may be performed in an injection compression molding machine.

Other features and aspects will be apparent from the following detailed description, the drawings, and the claims.

BRIEF DESCRIPTION OF DRAWING

Throughout the drawings and the detailed description, the same reference numerals refer to the same elements. The drawing may not be to scale, and the relative size, proportions, and depiction of elements in the drawing may be exaggerated for clarity, illustration, and convenience.

DETAILED DESCRIPTION

Figure 1:
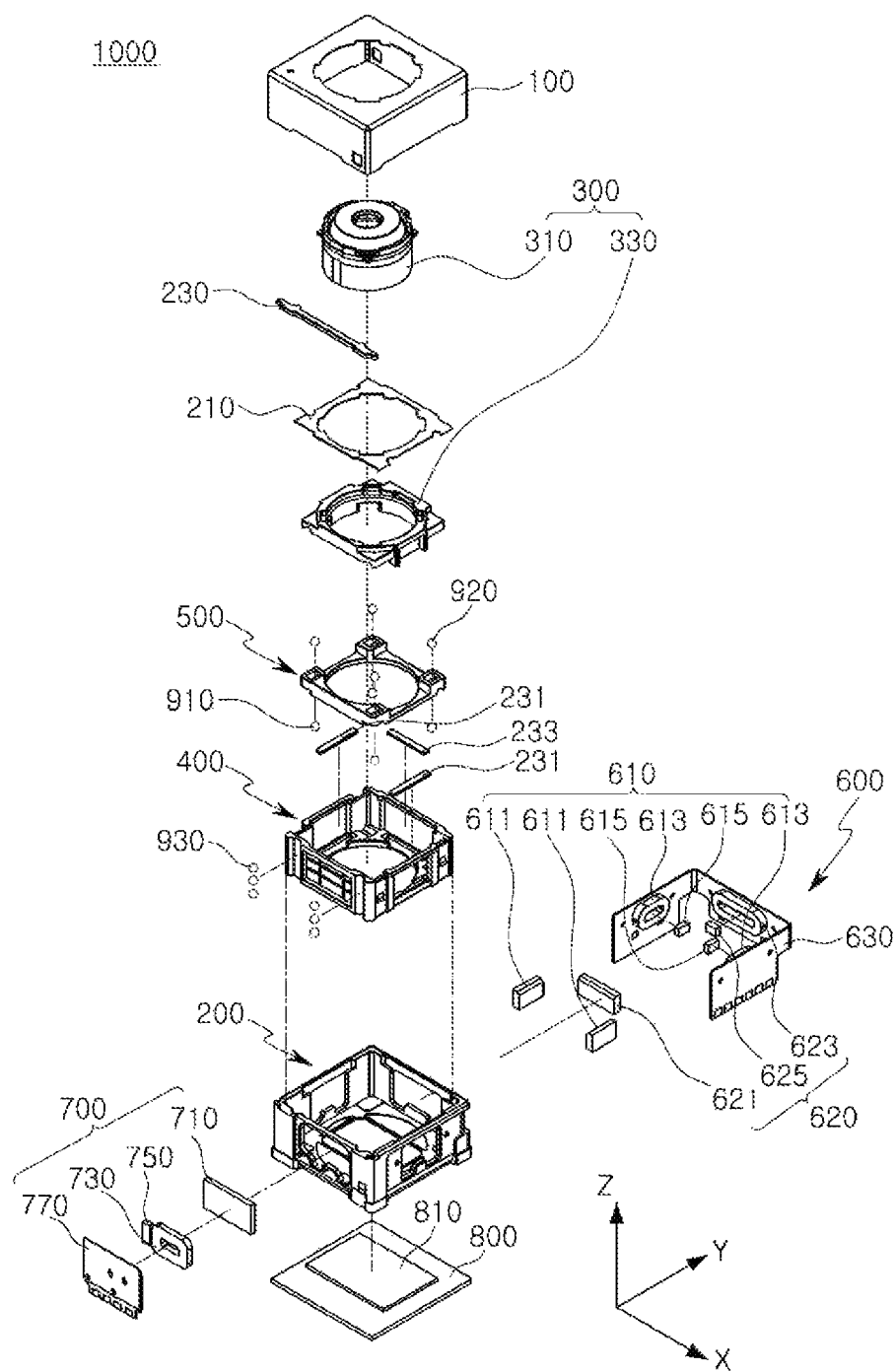
FIG. 1 is a perspective view illustrating an example of a camera module.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, terms used in the description are defined.

An aliphatic chain is a linear or branched aliphatic compound, for example, saturated or unsaturated hydrocarbon, alkoxy, alkyl ester, alkyl ether, thioalkyl and the like, but it is not limited thereto. An aliphatic chain may include at least one substituent on a backbone and/or a branched chain. The substituent may be, for example, an oxygen, a hydroxy group, a carboxyl group, an alkyl group, a cyano group, an ester group, an ether group, an amide group, an imide group, an alkoxy group or a combination thereof, but it is not limited thereto.

An aliphatic ring is a ring-typed aliphatic compound such as a monocyclic or polycyclic compound formed by condensing 2 or more rings, for example, a saturated or unsaturated hydrocarbon ring such as cycloalkyl. An aliphatic ring, as referred to in this description, includes a hetero ring so that atoms in the aliphatic ring may include oxygen, phosphorous, silicon and the like in addition to carbon. An aliphatic ring may include at least one substituent which may be, for example, an oxygen, a hydroxy group, a carboxyl group, an alkyl group, a cyano group, an ester group, an ether group, an amide group, an imide group, an alkoxy group or a combination thereof, but it is not limited thereto.

An aromatic ring is a ring-typed aromatic compound such as a monocyclic or polycyclic compound formed by condensing 2 or more rings. Examples of an aromatic ring includes an aryl compound such as phenyl, naphthalene and the like. The aromatic ring may include a substituent. The substituent may be, for example, an oxygen, a hydroxy group, a carboxyl group, an alkyl group, a cyano group, an ester group, an ether group, an amide group, an imide group, an alkoxy group or a combination thereof, but it is not limited thereto.

The glass transition temperature (Tg) of a material refers to the temperature at which the mechanical behavior of the material changes from rigid and brittle to tough and leathery. It may be determined using differential scanning calorimeter (DSC) and the like.

Unless otherwise defined, all terms, including technical terms and scientific terms, used herein have the same meaning as how they are generally understood by those of ordinary skill in the art to which the present disclosure pertains. Any term that is defined in a general dictionary shall be construed to have the same meaning in the context of the relevant art, and, unless otherwise defined explicitly, shall not be interpreted to have an idealistic or excessively formalistic meaning.

According to an example, there is provided a polyphosphonate including a constitutional repeating unit including a phosphate ester group and an aromatic ring, wherein the phosphate ester group and the aromatic ring are directly connected with each other.

A polyphosphonate according to an example includes a constitutional repeating unit including a phosphate ester group and an aromatic ring therein which improves refractive index, increases injection moldability, optical properties and processability so that the polymer may be used to provide a lens with such properties.

A polyphosphonate according to an example includes a constitutional repeating unit represented by the following Formula 1:

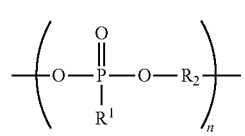

[Formula 1]

wherein, $R_1$ is a heavy hydrogen, a substituted or unsubstituted $C_1$-$C_{10}$ aliphatic chain, a substituted or unsubstituted $C_3$-$C_{10}$ aliphatic ring, a substituted or unsubstituted $C_6$-$C_{20}$ aromatic ring, or a combination thereof; n is an integer of 5 to 500; $R_2$ is one of Formula 2 to Formula 5.

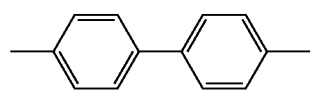

[Formula 2]

[Formula 3]

[Formula 4]

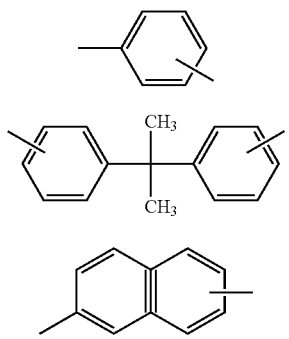

[Formula 5]

In Formula 1, the phosphate ester group and the aromatic ring may be connected directly without any additional bonding group between the phosphate ester group and the aromatic ring.

In Formula 1, $R_2$ may be an aromatic ring represented by one of Formula 2 to Formula 5 which is directly connected with the phosphate ester group, but a position of the aromatic ring may not be limited.

According to an example, as in Formula 1, a polyphosphonate is provided, which includes the phosphate ester group and the aromatic ring at the same time, includes the constitutional repeating unit including the phosphate ester group and the aromatic ring, which are bonded with each other directly, and has thus high refractive index at the visible light region and good transmissibility.

A polyphosphonate according to another example may include a constitutional repeating unit represented by the following Formula 6:

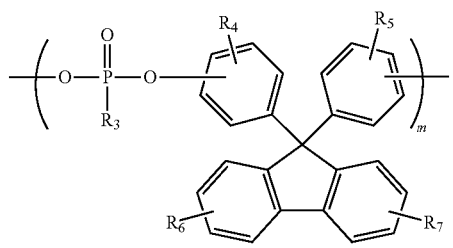

Formula 6 wherein, $R_3$ is a heavy hydrogen, a substituted or unsubstituted $C_1$-$C_{10}$ aliphatic chain, a substituted or unsubstituted $C_3$-$C_{10}$ aliphatic ring, a substituted or unsubstituted $C_6$-$C_{20}$ aromatic ring, or a combination thereof; $R_4$ to $R_7$ is the same or different, independently, a hydrogen atom, a substituted or unsubstituted $C_1$-$C_{20}$ aliphatic chain, a substituted or unsubstituted $C_3$-$C_{10}$ aliphatic ring, a substituted or unsubstituted $C_6$-$C_{20}$ aromatic ring, or a combination thereof; m is an integer of 5 to 500.

In Formula 6, the phosphate ester group and the fluorene group may be connected directly without any additional bonding group between the phosphate ester group and the aromatic ring of the fluorene group, but a position of the aromatic ring of the fluorene group may not be limited.

According to an example, as in Formula 6, a polyphosphonate is provided, which includes the phosphate ester group and the fluorene group at the same time, includes the constitutional repeating unit including the phosphate ester group and the aromatic ring of the fluorene group, which are bonded with each other directly, and has thus high refractive index at the visible light region and good transmissibility.

Furthermore, the polyphosphonate according to an example does not include a sulfur (S) atom, particularly the sulfur(S) atom which is bonded to a phosphorus (P) atom, for example P=S, P—S. Thus, the polyphosphonate may improve transmissibility.

Furthermore, polyphosphonate according to an example is environmentally friendly since any halogen substituent such as Br or Cl is not used in the structure unit which causes dioxin to form even though its use improves optical properties.

Furthermore, the polyphosphonate according to an example does not include a nitrogen (N) atom which is directly bonded to at least one hydrogen atom, for example, —NH and —NH$_2$. Thus, the polyphosphonate may improve transmissibility.

Furthermore, the polyphosphonate according to an example may have excellent processability and be suitable for lens through injection molding since it is not decomposed at a high temperature of 200° C. or higher. The polyphosphonate may also have scratch resistant properties due to high hardness.

The polyphosphonate copolymer according to an example may be formed through a condensation polymerization between an aromatic dihydroxy compound and a diphosphonic acid or its ester forming derivative.

Examples of the aromatic dihydroxy compound may include hydroquinone, resorcinol, 4,4'-dihydroxybiphenyl, 4,4'-cyclohexylidene diphenol, bisphenol A, bis(4-hydroxyphenyl) methane, 2,2-bis(2-hydroxyphenyl) propane, dihydroxy diphenyl ether, dihydroxybenzophenone, 1,5-dihydroxy naphthalene, 2,5-dihydroxy naphthalene, 2,2-bis(3,5-dimethyl-4-hydroxyphenyl) propane, 4,4'-bis (hydroxyphenyl) phenylphosphineoxide, α,α'-bis(4-hydroxy-3-methylphenyl)-1,4-diisopropylbenzene, 2,2-bis (4-hydroxy-3-methyl-phenyl) propane, dihydroxy diphenyl ether, 1,3-bis(4-hydroxyphenoxy)benzene, 9,9-bis(4-hydroxyphenyl) fluorene, 9,9-bis(4-hydroxy-3-methyl-phenyl) fluorene and a combination thereof, but it is not limited thereto.

Examples of the diphosphonic acid or its ester forming derivative may include phenylphosphonic acid, methylene phosphonic acid, phenylphosphonic dichloride, methylene phosphonic dichloride, and a combination thereof, but it is not limited thereto.

$R_1$ in Formula 1 and $R_3$ in Formula 6 may vary with a kind of diphosphonic acid or its ester forming derivative monomer which is involved with the polymerization.

According to an example, a lens including the polyphosphonate according to an example is provided.

Detail description of the polyphosphonate will be omitted since it is the same as described above.

A lens according to an example may be formed through molding. For example, the lens may be formed by injection molding the polyphosphonate polymer.

The lens according to an example may be formed by, for example, injection molding the polyphosphonate polymer with an injection molding machine or an injection compression molding machine. The polyphosphonate polymer may be molded at a temperature of 200° C.-300° C., but it is not limited thereto. The polyphosphonate polymer may be, for example, injection molded at a temperature of about 240° C. to 280° C.

The lens molded from the polyphosphonate polymer may have high optical properties such as good refraction properties, transmissibility and the like.

For example, the lens according to an example has a refractive index of 1.570 or higher, or 1.620 or higher, determined at a wavelength of 587 nm, an Abbe's number of 23 or higher such as about 23 to 27, an APHA value of 50 or less which is associated with colorless and transparency, and a transmissibility of 85% or more such as about 86% to 93%.

The lens may be formed in an aspherical shape if needed, but it is not limited thereto. The aspherical lens may be used as a camera lens among optical lenses. A coating layer such as an anti-reflection layer or a hard-coat layer may be formed on the surface of the lens, if needed.

Furthermore, the lens may be used in a variety of lenses such as pick-up lenses, f-θ lenses, glass lenses and the like. For example, it may be used as lenses for single lens reflexes, digital still cameras, video cameras, camera-equipped cellular phones, lens-equipped films, telescopes, binoculars, microscopes, projectors and the like.

Furthermore, the lens may be applied into a camera module. According to another example of the present disclosure, a camera module including the lens described above is provided.

Hereinafter, although more detailed descriptions will be given by examples, those are only for explanation and there is no intention to limit the disclosure.

Example

Synthesis of poly(biphenylphenylphosphonate)-polyphosphonate polymer 1

According to one example, 4,4'-dihydroxybiphenyl and phenylphosphonic dichloride is used as starting materials to produce a polymer, as depicted in Scheme 1.

Scheme 1

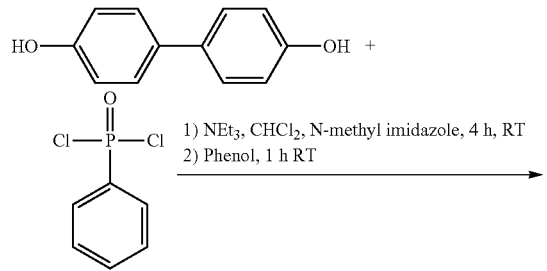

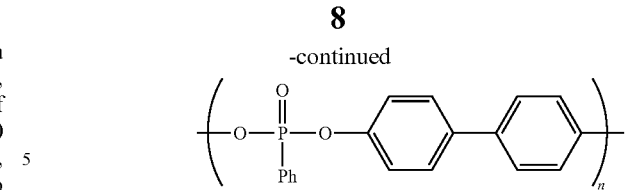

Hereinafter, an example of a method of preparing a polyphosphonate polymer is further described.

A flask including a magnetic stirrer was dried in a high-temperature oven and then cooled down to room temperature under vacuum. The preparation of 4,4'-dihydroxybiphenyl involved adding 2.44 g of 4,4'-dihydroxybiphenyl to a flask and placing the flask under vacuum. Dichloromethane (20 mL) was added to the flask using a cannula, and then 4.56 mL of trimethylamine and 32 μL of N-methylimidazole were added to the flask using a syringe.

The reaction flask was placed in an ice bath, and 2.13 g of phenylphosphonic dichloride was added using a syringe under nitrogen atmosphere to the flask placed in the ice bath. The reaction mixture was, then, stirred for 4 hours at room temperature.

After 4 hours, 1.23 g of phenol was added, and the reaction was carried for additional 1 hour. When the reaction completed, the reaction mixture was washed with water twice, 5% aqueous solution of HCl, and again with water 3 times. The polymer precipitated out in methanol, and the precipitate was collected and dried in a vacuum oven at 120° C. for about 1 day.

The identity of the collected precipitate was then determined to be poly(biphenylphenylphosphonate) polymer by using NMR ($^1$H NMR (500 MHz, DMSO) δ7.77-7.71 (m, 5H, Ar O—C$_6$H$_5$), 7.40-7.29 (dd, 8H, Ar O—C$_6$H$_4$—C$_6$H$_4$)).

Synthesis of Polyphosphonate Polymers 2 to 7

Polyphosphonate polymers 2 to 7 were prepared in the same manner as described in the synthesis of poly(biphenylphenylphosphonate)(polyphosphonate polymer 1), except using different aromatic dihydroxy compound and diphosphonic acid or its ester forming derivative as a monomer.

Structures and NMR data for the polyphosphonate polymers 2 to 7 are summarized in Table 1.

TABLE 1

| Polymer no. | Polymer structure | Additional reactant after 4 hrs | NMR (ppm, DMSO) |
|---|---|---|---|
| Polymer 2 | ![structure with Me] | Phenol-OH | $^1$H NMR δ 7.69 (d, J = 5.3, 4H, Ar), 7.32 (d, J = 5.3, 4H, Ar), 1.91 (s, 3H, CH$_3$)/$^{31}$P{$^1$H} NMR δ 25.86 |
| Polymer 3 | ![structure with Ph] | Phenol-OH | $^1$H NMR δ 7.88 (d of d, J = 7.9, 4H, Ar), 7.67 (t, J = 6.8, 2H, Ar), 7.55 (t, J = 6.5, 3H, Ar)/$^{31}$P{$^1$H} NMR δ 12.54 |

TABLE 1-continued

| Polymer no. | Polymer structure | Additional reactant after 4 hrs | NMR (ppm, DMSO) |
|---|---|---|---|
| Polymer 4 | [structure: phosphonate with bisphenol-A type linkage, Ph on P] | phenol (PhOH) | $^1$H NMR δ 7.83-7.53 (m, 5H, Ar), 7.14-7.00 (m, 8H, Ar), 1.49 (s, 6H, CH$_3$)/$^{31}$P{$^1$H} NMR δ 11.92 |
| Polymer 5 | [structure: phosphonate with 2,6-naphthalene linkage, Ph on P] | None | $^1$H NMR δ 7.98 (q, J = 5.9, 2H, Ar), 7.89 (d, J = 9.0, 2H, Ar), 7.76 (s, 2H, Ar), 7.67 (t, J = 6.1, 1H, Ar), 7.57 (t, J = 5.8, 2H, Ar), 7.39 (t, J = 9.0, 2H, Ar)/$^{31}$P{$^1$H} NMR δ 12.49 |
| Polymer 6 | [structure: phosphonate with 2,7-naphthalene linkage, Ph on P] | phenol (PhOH) | $^1$H NMR δ 7.79 (qt, J = 7.1, 2H, Ar), 7.88 (d, J = 8.5, 2H, Ar), 7.8 (s, 2H, Ar), 7.64 (t, J = 7.1, 1H, Ar), 7.54 (t, J = 7.0, 2H, Ar), 7.34 (d, J = 8.5, 2H, Ar)/$^{31}$P{$^1$H} NMR δ 12.36 |
| Polymer 7 | [structure: phosphonate with 9,9-bis(phenyl)fluorene linkage, Ph on P] | phenol (PhOH) | $^1$H NMR δ 7.88-7.78 (m, 8H, Ar), 7.61-7.45 (m, 5H, Ar), 7.32-7.20 (m, 8H, CH$_3$)/$^{31}$P{$^1$H} NMR δ 11.96 |

Determination of Properties of Polyphosphonate Polymers

Gel permeation chromatography molecular weights and glass transition temperatures (Tg) of the polyphosphonate polymers 1 to 7 prepared as described above were determined, and the result is summarized in Table 2.

TABLE 2

| polymer no. | GPC molecular weight | | | DSC Tg (° C.) | TGA Td 5 wt % (° C.) |
|---|---|---|---|---|---|
| | Mn, *100 | Mw, *100 | Mw/Mn | | |
| Polymer 1 | 41.8 | 75.7 | 1.81 | 140 | 412 |
| Polymer 2 | 17.7 | 20.0 | 1.13 | 119 | 367 |
| Polymer 3 | 19.3 | 22.1 | 1.15 | 116 | 396 |
| Polymer 4 | 60.3 | 139.8 | 2.32 | 127 | 402 |
| Polymer 5 | 71.4 | 212.6 | 2.98 | 147 | 467 |
| Polymer 6 | 72.0 | 216.0 | 3.00 | 117 | 347 |
| Polymer 7 | 53.6 | 154.3 | 2.32 | 127 | 402 |

Preparation of Lens and its Properties

Each of the polyphosphonate polymers 1 to 7 prepared as described above was introduced in a mold having 2 cm, 2 cm and 1 mm of width, length, and thickness, respectively and heated to be melted. The mold was removed to provide a test sample and lens optical properties such as a refractive index, an Abbe's number, a transmissibility and an APHA value were determined. The result is summarized in Table 3.

TABLE 3

| Polymer no. | Refractive Index (587 nm, 25° C.) | ABBE's number | Transmissibility | APHA value |
|---|---|---|---|---|
| Polymer 1 | 1.596 | 25 | 91% | 41 |
| Polymer 2 | 1.630 | 25 | 91% | 42 |
| Polymer 3 | 1.584 | 26 | 86% | 49 |
| Polymer 4 | 1.575 | 27 | 89% | 48 |
| Polymer 5 | 1.622 | 26 | 88% | 46 |
| Polymer 6 | 1.633 | 25 | 87% | 46 |
| Polymer 7 | 1.666 | 23 | 93% | 40 |

Referring to Table 2, the polyphosphonate polymer according to an example has a low glass transition temperature (Tg) which is suitable for injection molding. Referring to Table 3, the lens prepared by using the polyphosphonate polymer according to an example has excellent optical properties and transmissibility such as a refractive index of 1.570 or higher, a transmissibility of 86% or higher, a low APHA value of 50 or less.

As demonstrated by Table 3, the polyphosphonate polymer including the phosphate ester group and the fluorene group has a high refractive index of about 1.66, a high transmissibility of 93%, and a low APHA value of 40 and further is colorless and transparent.

Camera Module

A camera module according to an example will be described below in more detail with reference to the accompanying drawing. It is to be appreciated that various changes and modifications may be made by those skilled in the art without departing from the spirit and scope of the present disclosure, as defined by the appended claims and their equivalents.

FIG. 1 illustrates a perspective view of an example of a camera module.

Referring to FIG. 1, a camera module 1000 includes a housing 200, a first frame 400 configured to receive the housing 200, a second frame 500 and a lens module 300 configured to be received to the first frame 400, a case 100 configured to be connected with the housing 200, and lens operating devices 600, 700.

The lens module 300 includes a lens barrel 310 and a third frame 330 configured to receive the lens barrel 310 therein.

In this example, the lens barrel 310 is formed in a hollow cylindrical shape to receive therein a plurality of lenses used to photograph a subject. The plurality of lenses are arranged in the lens barrel 310 along the Z direction (optic-axis).

The plurality of lenses may be laminated depending on the design of the lens barrel 310, and each lens may have the same or different optical properties including a refractive index and the like.

In this example, the lens barrel 310 is combined with the third frame 330.

The third frame 330 is installed inside the first frame 400 along with the second frame 500. For example, the second frame 500 and the third frame 330 may be arranged in order inside the first frame 400.

Furthermore, the second frame 500 and the third frame 330 is arranged in the Z direction from the inner bottom surface of the first frame 400.

For example, the inner bottom surface of the first frame 400 and the bottom surface of the second frame 500 are arranged to be spaced-apart in the Z direction, and the upper surface of the second frame 500 and the bottom surface of the third frame 330 are arranged to be spaced-apart in the Z direction.

The housing 200 may receive the first frame 400, the second frame 500 and the third frame 330.

Furthermore, a first substrate 800 in which an image sensor 810 is mounted is combined to the bottom part of the housing 200.

The housing 200 is opened to the Z direction to provide light to the image sensor 810.

The first frame 400, the second frame 500 and the third frame 330 may operate in the Z direction inside the housing 200 for automatic focus.

A stopper 210 is provided on the upper part of the housing 200 to limit a moving distance of the first frame 400, the second frame 500 and the third frame 330.

The stopper 210 also prevents the third frame 330 from escaping to the outside of the housing 200.

The case 100 may be combined with the housing 200 to cover the external surface of the housing 200 and further shield an electromagnetic wave which is generated during the operation of the camera module.

The first frame 400, the second frame 500 and the third frame 330 may be arranged to allow relative movement with respect to the housing 200.

Furthermore, the third frame 330 and the second frame 500 may be arranged to allow relative movement with respect to the first frame 400 inside the first frame 400.

In this example, the camera module 1000 includes lens operating devices 600, 700.

In this example, the lens operating devices 600, 700 includes a hand-shaking correction unit 600 and an auto-focusing unit 700. The hand-shaking correction unit 600 may correct for the blurriness in images or videos caused by shaky or unstable movement of a user's hand.

For example, the hand-shaking correction unit 600 may correct the image-instability problem associated with the hand-shake during photographing by allowing a relative displacement corresponding to the hand-shake to the third frame 330.

The auto-focusing unit 700 performs the auto focusing or zooming.

The auto-focusing unit 700 may perform auto focusing or zooming by operating the third frame 330 to the Z direction.

In this example, the auto-focusing unit 700 includes a third magnet 710 configured to be mounted on one surface of the first frame 400, a third coil 730 configured to be faced with the third magnet 710, and a third substrate 770 configured to supply power to the third coil 730. The auto-focusing unit 700 further includes a third hole sensor 750 configured to detect a position of the third magnet 710.

The third coil 730 is mounted on the third substrate 770 to be oppose the third magnet 710, and the third substrate 770 may be fixed to one surface of the housing 200.

The auto-focusing unit 700 may move the first frame 400 along the Z direction by using the electromagnetic influence between the third magnet 710 and the third coil 730.

Figure 2:
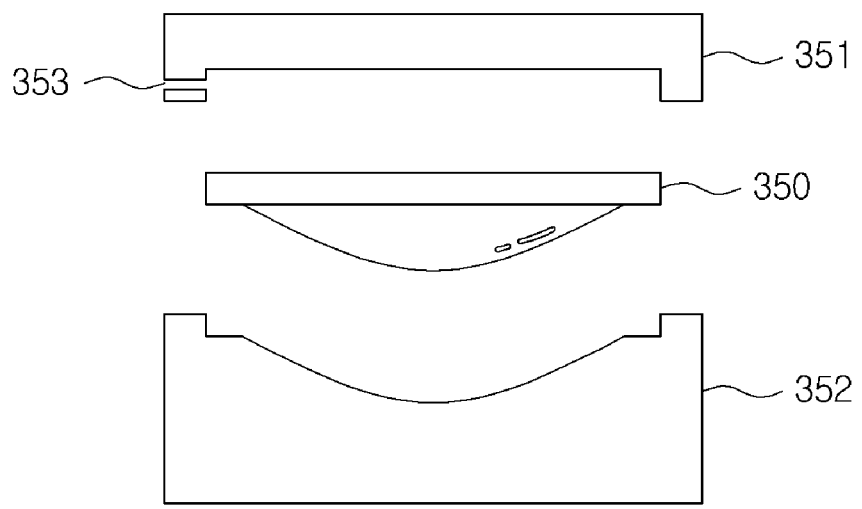
FIG. 2 is a cross-sectional view illustrating an example of a lens molding device for injection molding an aspherical lens.

FIG. 2 illustrates an example of a lens molding device for injection molding an aspherical lens.

Referring to FIG. 2, the lens molding device is an injection molding machine 2000. An aspherical lens 350 having a surface profile that is not a portion of a sphere is produced by an injection molding process, using an upper mold 351 and a lower mold 352. In this example, the upper mold 351 includes an injection inlet 353 for delivering a molten polymer into a cavity between the upper mold 351 and the lower mold 352. Those skilled in the art will recognize that various modifications may be made to the injection molding process, and these modifications are within the scope of the present description.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Therefore, the scope of the disclosure is defined not by the detailed description, but by the claims and their equivalents, and all variations within the scope of the claims and their equivalents are to be construed as being included in the disclosure.

What is claimed is:

1. A polyphosphonate comprising a constitutional repeating unit comprising a phosphate ester group and an aromatic ring, wherein the constitutional repeating unit is represented by the following formula:

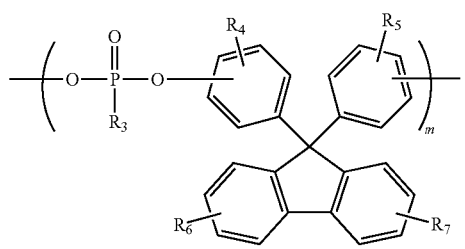

wherein $R_3$ is a heavy hydrogen, a substituted or unsubstituted $C_1$-$C_{10}$ aliphatic chain, a substituted or unsubstituted $C_3$-$C_{10}$ aliphatic ring, a substituted or unsubstituted $C_6$-$C_{20}$ aromatic ring, or a combination thereof;

$R_4$ to $R_7$ are the same or different, and independently, a hydrogen atom, a substituted or unsubstituted $C_1$ to $C_{20}$ aliphatic chain, a substituted or unsubstituted $C_3$-$C_{10}$ aliphatic ring, a substituted or unsubstituted $C_6$-$C_{20}$ aromatic ring, or a combination thereof; and m is an integer of 5 to 500.

2. The polyphosphonate of claim 1, wherein the polyphosphonate does not include a sulfur atom.

3. The polyphosphonate of claim 1, wherein the polyphosphonate does not include a halogen substituent.

4. The polyphosphonate of claim 1, wherein the polyphosphonate does not include a nitrogen atom that is directly bonded with at least one hydrogen atom.

5. The polyphosphonate of claim 1, wherein the polyphosphonate is formed by a condensation polymerization between an aromatic dihydroxy compound and a diphosphonic acid or its ester forming derivative.

6. A lens comprising the polyphosphonate according to claim 1.

7. The lens of claim 6, wherein the lens comprises an injection molded polymer composition comprising the polyphosphonate according to claim 1.

8. The lens of claim 6, wherein the lens has a refractive index of 1.57 or higher at a wavelength of 587 nm.

9. The lens of claim 6, wherein the lens has a transmissibility of 86% or higher.

10. The lens of claim 6, wherein the lens has an APHA value of 50 or less.

11. A camera module comprising a lens comprising the polyphosphonate according to claim 1.

12. A method of producing a lens, the method comprising: injection molding a lens using a polyphosphonate of claim 1.

13. The method of claim 12, wherein the injection molding is performed at a temperature between approximately 240° C. and 280° C.

14. The method of claim 13, wherein the injection molding is performed in an injection compression molding machine.

15. The polyphosphonate of claim 1 comprising a constitutional repeating unit represented by the following formula:

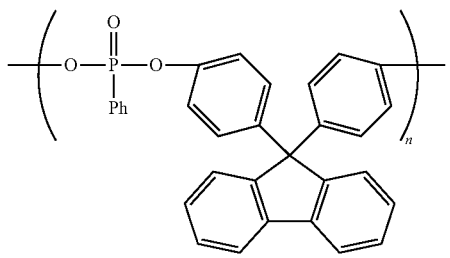

wherein n is an integer of 5 to 500.

* * * * *